(12) United States Patent
Tanaka et al.

(10) Patent No.: US 10,239,144 B2
(45) Date of Patent: Mar. 26, 2019

(54) WELDING DEVICE

(71) Applicant: Panasonic Intellectual Property Management Co., Ltd., Osaka (JP)

(72) Inventors: Yoshiaki Tanaka, Osaka (JP); Yoshiyuki Tabata, Hyogo (JP); Shinsuke Shimabayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 34 days.

(21) Appl. No.: 14/787,682

(22) PCT Filed: Jul. 7, 2014

(86) PCT No.: PCT/JP2014/003580
§ 371 (c)(1),
(2) Date: Oct. 28, 2015

(87) PCT Pub. No.: WO2015/011882
PCT Pub. Date: Jan. 29, 2015

(65) Prior Publication Data
US 2016/0144442 A1 May 26, 2016

(30) Foreign Application Priority Data

Jul. 23, 2013 (JP) .................. 2013-152491

(51) Int. Cl.
*B23K 9/09* (2006.01)
*B23K 9/073* (2006.01)
(Continued)

(52) U.S. Cl.
CPC .............. *B23K 9/073* (2013.01); *B23K 9/09* (2013.01); *B23K 9/095* (2013.01); *B23K 9/0953* (2013.01);
(Continued)

(58) Field of Classification Search
CPC . F01D 25/08; F01D 5/141; F01D 5/18; F01D 5/181; F01D 5/187; F01D 9/065;
(Continued)

(56) References Cited

U.S. PATENT DOCUMENTS

| | | | |
|---|---|---|---|
| 4,503,316 A | 3/1985 | Murase et al. | |
| 6,225,597 B1 * | 5/2001 | Kawamoto | B23K 9/091 219/130.21 |

(Continued)

FOREIGN PATENT DOCUMENTS

| | | |
|---|---|---|
| JP | 58-029575 | 2/1983 |
| JP | 58-159977 | 9/1983 |

(Continued)

OTHER PUBLICATIONS

International Search Report of PCT application No. PCT/JP2014/003580 dated Sep. 30, 2014.

*Primary Examiner* — Ibrahime A Abraham
*Assistant Examiner* — Chris Liu
(74) *Attorney, Agent, or Firm* — Wenderoth, Lind & Ponack, L.L.P.

(57) ABSTRACT

The welding device of the present disclosure has a switching section, a setting section, an output detector, a controller, a frequency controller, and a driver. The switching section is formed of a switching element. The setting section determines setting output. The output detector detects welding output. The controller calculates an output-on period of the switching section according to the setting output and the welding output. The frequency controller determines an inverter frequency based on the output-on period. The driver controls on/off operation of a switching element of the switching section based on the inverter frequency and the output-on period. When the output-on period is calculated using a first ratio, the inverter frequency is determined to a first frequency, and when the output-on period is calculated (Continued)

using a second ratio smaller than the first ratio, the inverter frequency is determined to a second frequency higher than the first frequency.

19 Claims, 7 Drawing Sheets

(51) Int. Cl.
| | | |
|---|---|---|
| *B23K 9/095* | (2006.01) | |
| *B23K 9/10* | (2006.01) | |
| *B23K 9/167* | (2006.01) | |
| *B23K 9/173* | (2006.01) | |
| *H02M 3/335* | (2006.01) | |
| *H02M 7/5387* | (2007.01) | |

(52) U.S. Cl.
CPC .......... *B23K 9/1043* (2013.01); *B23K 9/167* (2013.01); *B23K 9/173* (2013.01); *H02M 3/33515* (2013.01); *H02M 7/53871* (2013.01); *Y02P 70/181* (2015.11)

(58) Field of Classification Search
CPC .......... F05D 2240/11; F05D 2240/127; F05D 2250/71; F05D 2260/2212; F05D 2260/22141; B23K 9/073; B23K 9/09; B23K 9/095; B23K 9/0953; B23K 9/1043

USPC .......... 219/130.21, 130.31, 130.32, 130.33, 219/130.51, 130.01, 137 PS, 136, 137.2, 219/124.03, 124.02, 125.12; 363/15, 363/21.09

See application file for complete search history.

(56) References Cited

U.S. PATENT DOCUMENTS

| | | | |
|---|---|---|---|
| 6,335,511 B1 | 1/2002 | Rothermel | |
| 8,564,972 B2 | 10/2013 | Ohsaki et al. | |
| 2009/0127242 A1* | 5/2009 | Aimi .................... | B23K 9/0953 |
| | | | 219/137 PS |
| 2012/0120687 A1* | 5/2012 | Ohsaki .................. | B23K 9/067 |
| | | | 363/21.09 |
| 2013/0009687 A1* | 1/2013 | Matsuyama .............. | G06F 1/08 |
| | | | 327/299 |

FOREIGN PATENT DOCUMENTS

| | | |
|---|---|---|
| JP | 60-076278 | 4/1985 |
| JP | 60-074851 U | 5/1985 |
| JP | 61-135482 | 6/1986 |
| JP | 61-235079 | 10/1986 |
| JP | 61-295877 | 12/1986 |
| JP | 2-217166 | 8/1990 |
| WO | 2010/137278 | 12/2010 |

* cited by examiner

WELDING DEVICE

CROSS-REFERENCE TO RELATED APPLICATIONS

This application is a U.S. national stage application of the PCT International Application No. PCT/JP2014/003580 filed on Jul. 7, 2014, which claims the benefit of foreign priority of Japanese patent application 2013-152491 filed on Jul. 23, 2013, the contents all of which are incorporated herein by reference.

TECHNICAL FIELD

The present disclosure relates to a welding device that performs arc welding using inverter control.

BACKGROUND ART

Recently, the growing use of digital control and increase in speed of inverter frequencies allows a welding device working using inverter control to have welding output with various waveforms.

Such a welding device performing arc welding using inverter control has an inverter circuit of a full-bridge structure or a half-bridge structure. Switching elements that form a bridge are power semiconductor devices, such as an IGBT (Insulated Gate Bipolar Transistor) and a MOSFET (Metal-Oxide Semiconductor Field Effect Transistor). Such a power semiconductor device is generally driven by inverter frequencies ranging from several kilohertz to 400 kilohertz, and controls the primary current conduction width of a transformer connected to an inverter circuit, so that welding output is obtained.

As an inverter control method, a PWM (Pulse Width Modulation) method is well known (see Patent Literature 1, for example).

A conventional welding device working on inverter control will be described with reference to FIG. 7. Welding device 101 of FIG. 7 has primary rectifier 118, smoothing capacitor 119, switching section 102, transformer 120, secondary rectifier 121, current detector 103, setting section 108, controller 105, driver 107, and triangular-wave generator 127. Switching section 102 has first switching element TR1, second switching element TR2, third switching element TR3, and fourth switching element TR4. Controller 105 has output comparator 109 and calculator 110.

Welding device 101 is connected to external device 126 such as a power switchboard to get power supply. Besides, welding device 101 has connection to base metal 122 and torch 123 to feed them with welding output. Torch 123 has electrode 124. Welding device 101 supplies electrode 124 and base metal 122 with welding output to generate arc 125 between them, by which welding is performed on base metal 122. The "welding output" mentioned in the description collectively means welding current and welding voltage fed from the welding device.

The workings of welding device 101 having the aforementioned structure will be described below, taking a consumable-electrode type arc welding device as an example.

In FIG. 7, AC voltage, which is fed from external device 126 to welding device 101, is rectified by primary rectifier 118 and then converted into DC voltage by smoothing capacitor 119. The DC voltage fed from smoothing capacitor 119 is further converted, through inverter driving by switching section 102, into high-frequency AC voltage suitable for welding. The high-frequency AC voltage having undergone conversion in switching section 102 is fed into transformer 120 to have transformation. Switching section 102 is formed of first switching element TR1 through fourth switching element TR4 of IGBT. First switching element TR1 through fourth switching element TR4 are switched on/off on PWM method in response to an instruction from driver 107. Switching section 102 thus performs inverter operation. The high-frequency AC voltage fed from transformer 120 is rectified by secondary rectifier 121 formed of, for example, a diode.

One of the welding output from welding device 101 is supplied, via a contact tip (not shown) disposed inside torch 123, to electrode 124 that is a consumable electrode wire. Wire feeding motor (not shown) feeds the consumable electrode wire to torch 123. The other of the welding output is fed to base metal 122. With the structure above, applying voltage between the tip of electrode 124 and base metal 122 generates arc 125, by which welding is performed on base metal 122.

Current detector 103 formed of, for example, a CT (Current Transformer) detects welding current and outputs it. Setting section 108 outputs set current suitable for setting output. Controller 105 receives the set current fed from setting section 108 and the welding current fed from current detector 103. Output comparator 109 of controller 105 calculates difference between the set current and the welding current, and outputs the current difference. According to the current difference, calculator 110 of controller 105 calculates an output-on period of switching section 102 and outputs it. In this way, through feedback control on welding current, controller 105 outputs an appropriate output-on period to driver 107.

Switching section 102 are operated under pulse control by driver 107 according to a cycle determined by a reference triangular wave generated by triangular-wave generator 127 and an output-on period fed from calculator 110 of controller 105. The pulses used for the pulse control on switching section 102 are separated into two lines every other pulse. Specifically, driver 107 outputs the first drive signal and the second drive signal (as the signals separated into two lines) to switching section 102. Triangular-wave generator 127 generates a reference triangular wave that determines an inverter frequency. Driver 107 outputs pulse-width-controlled drive signals in a way that the signals (separated into the two lines) are fed alternately with a cycle that corresponds to the reciprocal of an inverter frequency. The first drive signal synchronizes first switching element TR1 with fourth switching element TR4 to control their on/off, while the second drive signal synchronizes second switching element TR2 with third switching element TR3 to control their on/off.

According to the conventional inverter control described above, a low inverter frequency increases the ripple factor of welding voltage, and causes arc interruption, thereby degrading welding performance. Increasing the inductance (L value) of a DC reactor (i.e. DCL, not shown) disposed on the output side of welding device 101 may be effective in decreasing the ripple factor of welding voltage. However, an increased L value of DCL can fail to produce various welding output waveforms with steep changes.

Preferably, the inverter frequency should be kept high, whereas the ripple factor of welding voltage and the L value of DCL should be kept low. However, increasing an inverter frequency also increases a switching loss of a switching element, thereby heating up switching section 102. This has caused a necessity of countermeasures against heat.

CITATION LIST

Patent Literature

PTL 1: Japanese Unexamined Patent application Publication No. 61-295877

SUMMARY OF THE INVENTION

In conventional welding device 101 described above, the inverter frequency has a fixed value determined by the reference triangular wave fed from triangular-wave generator 127. The greater the output-on period, the greater the amount of Joule heat generated in switching section 102. That is, it is necessary to suppress heat generation due to switching loss while taking the maximum value of Joule heat into consideration. Therefore, the inverter frequency of a fixed value is limited to a constant level.

The structure of the present disclosure provides a high-performance welding device capable of changing the inverter frequency so as to be suitable for an output-on period.

To address the aforementioned problem, the welding device of the present disclosure has a switching section, a setting section, an output detector, a controller, a frequency controller, and a driver. The switching section has a switching element. The setting section determines setting output. The output detector detects welding output. The controller calculates an output-on period of the switching section based on the setting output and the welding output. The frequency controller determines an inverter frequency based on the output-on period. The driver controls on/off operation of a switching element based on the inverter frequency and the output-on period. With the structure above, when the output-on period is calculated using a first ratio, the inverter frequency is determined to a first frequency, and when the output-on period is calculated using a second ratio smaller than the first ratio, the inverter frequency is determined to a second frequency higher than the first frequency.

The welding device of the present disclosure, as described above, changes the inverter frequency so as to be suitable for the output-on period, offering high-quality welding.

DESCRIPTION OF EMBODIMENTS

Exemplary Embodiment 1

The structure of the exemplary embodiment is described with reference to FIG. 1 through FIG. 4.

Figure 1:
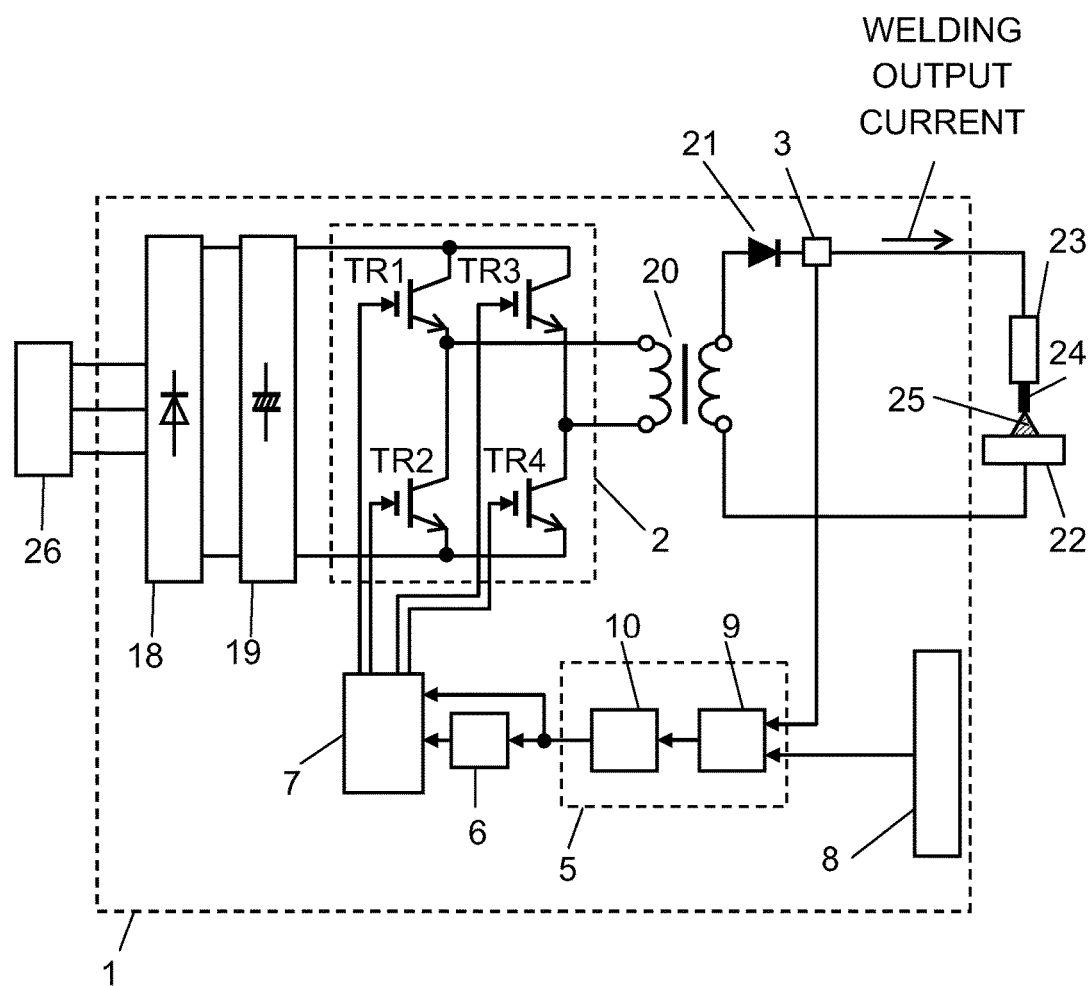
FIG. 1 schematically shows the structure of a welding device in accordance with a first exemplary embodiment.
Figure 2:
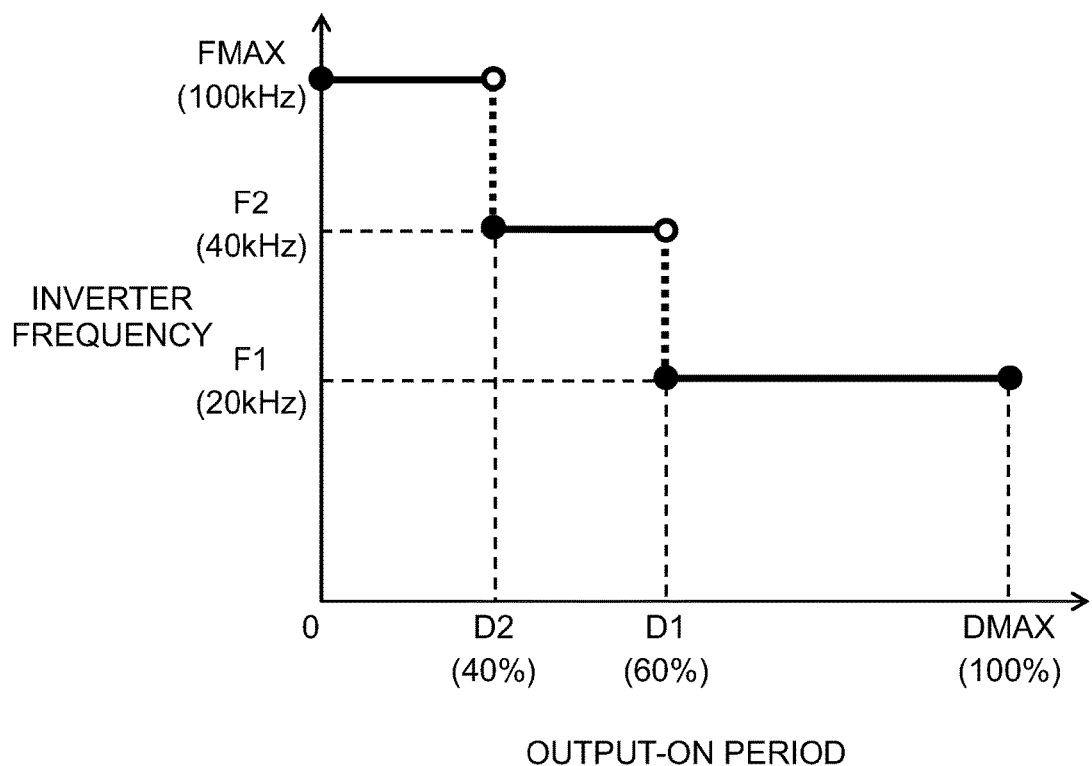
FIG. 2 is a graph showing that the inverter frequency changes stepwise in the output-on period of a welding device in accordance with the first exemplary embodiment.
Figure 3:
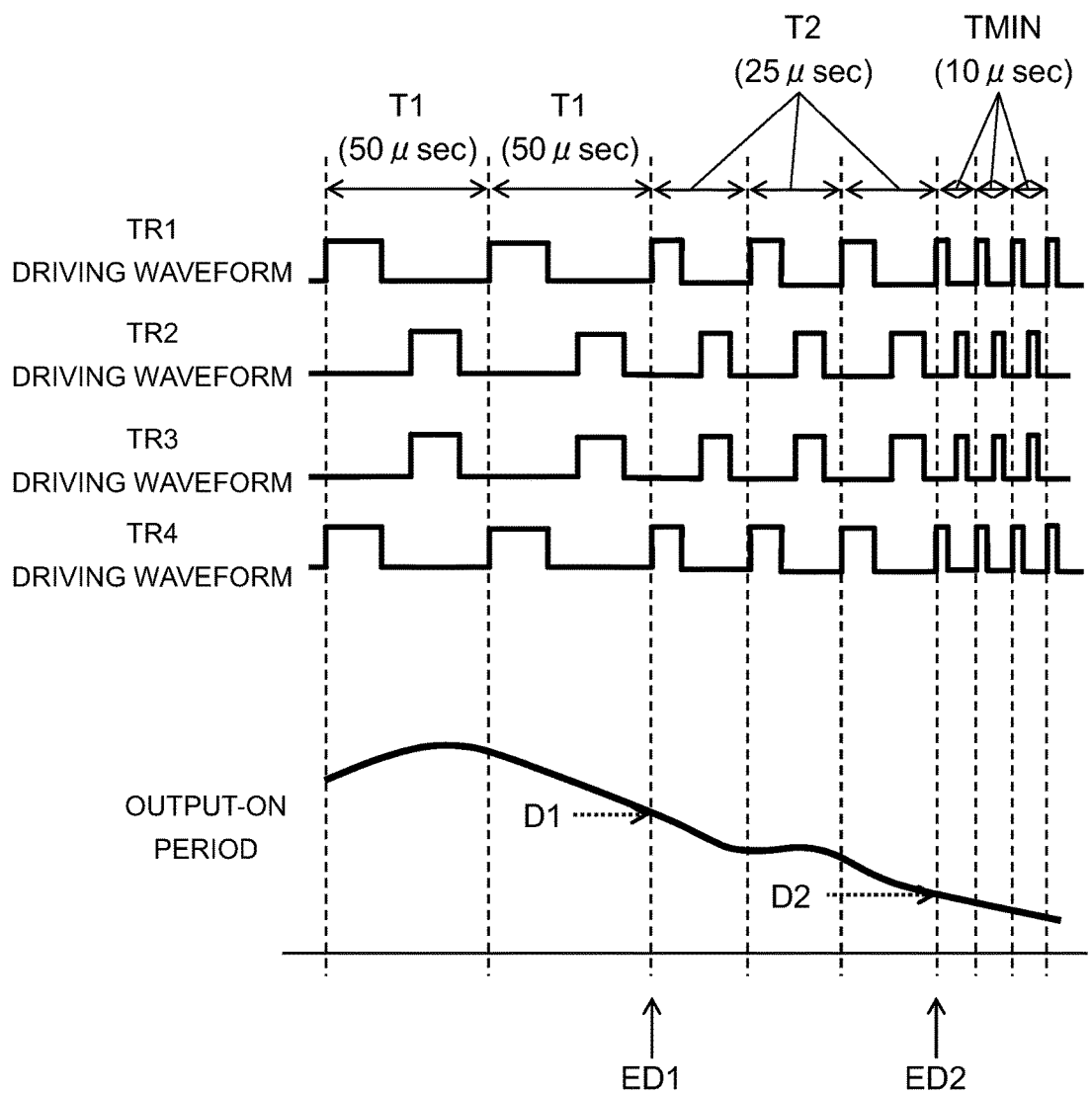
FIG. 3 shows changes over time in the output-on period and a driving timing of each switching element in accordance with the first exemplary embodiment.
Figure 4:
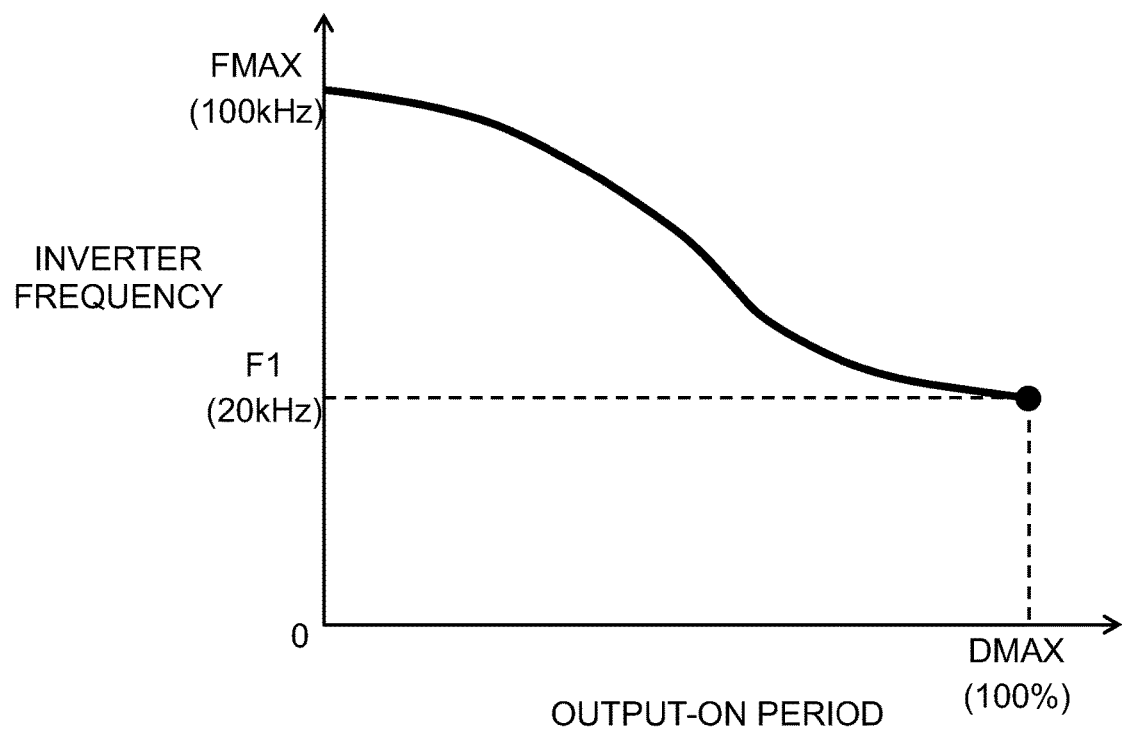
FIG. 4 is a graph showing that the inverter frequency changes continuously in the output-on period in accordance with the first exemplary embodiment.

FIG. 1 schematically shows the structure of welding device 1 in accordance with the first exemplary embodiment. FIG. 2 is a graph showing that the inverter frequency changes stepwise in the output-on period of a welding device of the embodiment. FIG. 3 shows changes over time in the output-on period and driving timing of each switching element of the embodiment. FIG. 4 is a graph showing that the inverter frequency changes continuously in the output-on period of the embodiment.

As shown in FIG. 1, welding device 1 has primary rectifier 18, smoothing capacitor 19, switching section 2, transformer 20, secondary rectifier 21, current detector 3, setting section 8, controller 5, frequency controller 6, and driver 7. Switching section 2 has first switching element TR1, second switching element TR2, third switching element TR3, and fourth switching element TR4. Controller 5 has output comparator 9 and calculator 10.

On the input side of welding device 1, external device 26 such as a power switchboard is connected. It supplies welding device 1 with a commercial power of 200 V AC. On the output side of welding device 1, base metal 22 and torch 23 are connected. Torch 23 has electrode 24. Welding device 1 feeds between electrode 24 and base metal 22 with welding output and generates arc 25 between them, by which welding is performed on base metal 22. The "welding output" mentioned in the description collectively means welding current and welding voltage fed from the welding device.

The workings of welding device 1 structured above will be described below, taking a consumable-electrode arc welding device (in which a short-circuit state and an arc state are repeated) as an example.

In FIG. 1, AC voltage, which is fed from external device 26 to welding device 1, is rectified by primary rectifier 18 and then converted into DC voltage by smoothing capacitor 19. Primary rectifier 18 is formed of, for example, a diode, and smoothing capacitor 19 is formed of, for example, an electrolytic capacitor.

The DC voltage fed from smoothing capacitor 19 is further converted, through inverter driving by switching section 2, into high-frequency AC voltage suitable for welding. The high-frequency AC voltage having undergone conversion in switching section 2 is fed into transformer 20 and is transformed. Switching section 2 is formed of first switching element TR1 through fourth switching element TR4 of IGBT. First switching element TR1 through fourth switching element TR4 are switched on/off on PWM method in response to an instruction from driver 7. Switching section 102 thus performs inverter operation. Instead of an IGBT, power semiconductor devices such as a MOSFET (Metal-Oxide Semiconductor Field Effect Transistor) can be employed for the switching element. The high-frequency AC voltage fed from transformer 20 is rectified by secondary rectifier 21 and then fed to base metal 22 and torch 23.

One of the welding output of welding device 1 is fed as a positive output, via a contact tip (not shown) disposed inside torch 23, to electrode 24 as a consumable electrode wire, which is fed by a wire feeding motor (not shown). The other of the welding output is fed as negative output to base metal 22. With the structure above, applying DC voltage between the tip of electrode 24 and base metal 22 generates arc 25, by which welding is performed on base metal 22. In the description of the embodiment, a structure having current feedback control will be described. In the structure, current detector 3 is disposed in series on the side of output connected to torch 23 so as to detect welding current. The current detector may be disposed in series on the other side of output connected to base metal 22. Further, the structure of the embodiment can be formed so as to have voltage feedback control. In that case, a voltage detector is connected in parallel between the two output lines—one is connected to base metal 22 and the other connected to torch 23—so as to detect welding voltage. The current detector and the voltage detector are collectively described as a detector.

Current detector 3 as an output detector, which is formed of, for example, a CT (Current Transformer), detects welding current. Setting section 8 receives welding setup data from user input and outputs set current suitable for the setup data. Setting section 8 also outputs set voltage, a feeding speed of the consumable electrode wire according to the setup data. Controller 5 receives the set current from setting section 8 and the welding current from current detector 3. Output comparator 9 of controller 5 calculates difference between the set current and the welding current and outputs the current difference to calculator 10. Calculator 10 of controller 5 calculates an output-on period of switching section 2 based on the current difference fed from output comparator 9. Through the workings above, current feedback control is performed. Calculator 10 has a table or a mathematical expression corresponding between a current difference (between the set current and the welding current) and an output-on period, and uses the correspondence data for calculating the output-on period. The calculation of the output-on period may be based on the current difference only; however a change ratio of the current difference may be taken into consideration. That is, the calculation may be performed by using one-to-one correspondence between current difference and the output-on period, or a current changing ratio may be additionally taken into consideration with respect to each current difference.

The "output-on period" mentioned in the description means the proportion of time of one cycle during which output is ON. The "output-on period" means the duty ratio in inverter control. For example, 100% output-on period means that output keeps ON throughout one cycle, providing the maximum output. Similarly, 40% output-on period means the state in which output keeps ON for 40% time of a cycle (in other words, 60% time of the cycle has no output). In the 40% output-on period, the amount of output current corresponds to 40% of the maximum output.

In the current feedback control, output comparator 9 calculates a difference (i.e. deviation) between welding current and set current. Next, calculator 10 employs proportional control in which the deviation is multiplied by a proportional gain to amplify the deviation, and calculates an output-on period.

Calculator 10 may employ PID control to calculate the output-on period. The PID control is a combination of proportional control, integral control using integral of the deviation, and derivative control using derivative of the deviation.

Frequency controller 6 is formed of a CPU, for example. According to the output-on period calculated by controller 5, frequency controller 6 determines an inverter frequency so as to change the inverter frequency in the output-on period. Specifically, when the output-on period is a first ratio, the inverter frequency is determined to a first frequency, and when the output-on period is a second ratio smaller than the first ratio, the inverter frequency is determined to a second frequency higher than the first frequency. Frequency controller 6 has a table or a mathematical expression corresponding between an output-on period and an inverter frequency, and determines an appropriate inverter frequency based on the received output-on period. When determining the inverter frequency, frequency controller 6 employs one-to-one correspondence between an output-on period and an inverter frequency.

Driver 7 controls on/off operation of first switching element TR1 through fourth switching element TR4 of switching section 2 according to the inverter frequency determined by frequency controller 6 and the output-on period determined by controller 5. Specifically, based on the cycle obtained from the inverter frequency and the output-on time in the cycle obtained from the output-on period, driver 7 controls on/off operation of the switching elements.

Next, the workings of welding device 1 will be described with reference to FIG. 2 through FIG. 4.

The output-on periods illustrated in FIG. 2 are, for example, first predetermined value D1 (60%), second predetermined value D2 (40%), and the maximum output-on period DMAX (100%). In FIG. 2, for example, the inverter frequency is determined as follows:

first inverter frequency F1 (e.g. 20 kHz) for an output-on period not less than first predetermined value D1 and not more than DMAX (i.e., between 60% and 100%);

second inverter frequency F2 (e.g. 40 kHz) for an output-on period not less than second predetermined value D2 and smaller than first predetermined value D1 (i.e., not less than 40% and is smaller 60%); and maximum inverter frequency FMAX (e.g. 100 kHz) for an output-on period not less than 0% and smaller than second predetermined value D2 (i.e., not less than 0% and is smaller than 40%).

As for each cycle of the inverter frequencies, first inverter frequency F1 has first cycle T1 (of 50 µs, for example), second inverter frequency F2 has second cycle T2 (of 25 µs, for example), and maximum inverter frequency FMAX has minimum cycle TMIN (of 10 µs, for example). FIG. 2 shows that the inverter frequency changes stepwise in the output-on period.

FIG. 3 shows that the output-on period reaches first predetermined value D1 at time ED1 and reaches second predetermined value D2 at time ED2.

A frequency control, which the inverter frequency has a stepwise increase as the output-on period decreases, will be described with reference to FIG. 2.

In FIG. 2, receiving an output-on period calculated by controller 5, frequency controller 6 determines the inverter frequency as follows:

when the output-on period is not less than first predetermined value D1 and not more than maximum output-on period DMAX, the inverter frequency is determined to first inverter frequency F1;

when the output-on period is not less than second predetermined value D2 and is smaller than first predetermined value D1, the inverter frequency is determined to second inverter frequency F2; and when the output-on period is not less than 0% and is smaller than second predetermined value D2 (i.e., at least 0% and is smaller than 40%), the inverter frequency is determined to maximum inverter frequency FMAX.

Inverter frequencies F1, F2, and FMAX may be determined so as to have doubling increase therebetween, such as first inverter frequency F1 of 10 kHz, second inverter frequency F2 of 20 kHz, and maximum inverter frequency FMAX of 40 kHz. They may be determined so as to have integral multiple relationship therebetween. Changing the inverter frequency on the basis of integral multiple has an advantage that a feedback control frequency can be set to a fixed value (e.g. 10 kHz).

As shown in FIG. 2, until the output-on period gets down to first predetermined value D1, frequency controller 6 maintains first inverter frequency F1. Upon the output-on period falls below first predetermined value D1, frequency controller 6 changes the frequency to second inverter frequency F2 greater than first inverter frequency F1. Further, upon the output-on period falls below second predetermined value D2, frequency controller 6 changes the frequency to maximum inverter frequency FMAX greater than second inverter frequency F2.

The description hereinafter is on the drive timing of first switching element TR1 through fourth switching element TR4 with changes in the output-on period in the aforementioned frequency control (where the inverter frequency has a stepwise increase as the output-on period decreases) with reference to FIG. 1 and FIG. 3.

An inverter control using the PWM method will be described with reference to FIG. 3. FIG. 3 shows a drive waveform of each switching element. In each waveform, the high level indicates that the corresponding switching element maintains ON and the low level indicates that the corresponding switching element maintains OFF. First switching element TR1 operates in synchronization with fourth switching element TR4; similarly, second switching element TR2 operates in synchronization with third switching element TR3. No current flows when all of the switching elements maintain OFF. When the pair of first switching element TR1 and fourth switching element TR4 maintains ON or when the pair of second switching element TR2 and third switching element TR3 maintains ON, current flows. The output-on period means the proportion of time of one cycle during which either one of the two pairs of switching elements maintains ON.

As shown in FIG. 3, until the output-on period calculated by controller 5 gets down to first predetermined value D1 at time ED1, first switching element TR1 through fourth switching element TR4 are driven on first inverter frequency F1 (with first cycle T1).

Upon the output-on period reaches first predetermined value D1 at time ED1, first switching element TR1 through fourth switching element TR4 are driven on second inverter frequency F2 (with second cycle T2).

Further, upon the output-on period reaches second predetermined value D2 at time ED2, first switching element TR1 through fourth switching element TR4 are driven on maximum inverter frequency FMAX (with minimum cycle TMIN).

In the inverter control described above, the inverter frequency (cycle) is determined so as to be suitable for the value of the output-on period at a start point of a cycle, and the switching elements work on the determined cycle.

Frequency controller 6, as shown in FIG. 4, may control the inverter frequency so as to change continuously in the output-on period. In FIG. 4, first inverter frequency F1 (of 20 kHz, for example) is employed for maximum output-on period DMAX (100%) and maximum inverter frequency FMAX is employed for the output-on period of 0%.

Further, the inverter control above may be performed with a combination of a stepwise change and a continuous change of the inverter frequency with respect to the output-on period.

According to the structure of the embodiment, as described above, the inverter frequency is determined to be a high value for a small output-on period. That is, a decreased output-on period also decreases generation of Joule heat, producing a margin even allowing for heat generation caused by switching loss. This allows the inverter frequency to determine at a high value, decreasing the ripple factor of welding voltage. As a result, a high-performance welding device is obtained. Further, such a controlled inverter frequency stabilizes the total amount of heat generated in the switching section, thereby minimizing countermeasures against heat.

Besides, as shown in FIG. 2, until the output-on period decreases to a predetermined value, frequency controller 6 constantly keeps the inverter frequency with no responding to some detection error, thereby providing stable control. In addition, the stepwise increase in inverter frequencies allows the control system suitable for each predetermined inverter frequency.

As shown in FIG. 4, changing the inverter frequency continuously offers an appropriate inverter frequency during operation.

The description of the inverter control method in the embodiment takes a PWM method as an example. However, other method, such as a phase shift method that output control is performed based on the inverter frequency may be employed.

Further, in the description of the embodiment, welding device 1 is a consumable-electrode arc welding device, however it is not limited to; welding device 1 may be a TIG (Tungsten Inert Gas) welding device and other welding devices as long as the device operates on inverter control.

Further, the description of the embodiment is given on current feedback control employing the current detector only as an output detector, however it is not limited to; the welding device may employ voltage feedback control. In that case, a voltage detector is disposed as an output detector to perform the voltage feedback control based on set voltage fed from setting section 8 and welding voltage detected by the voltage detector.

Exemplary Embodiment 2

The structure of the second exemplary embodiment is described with reference to FIG. 5 and FIG. 6.

Figure 5:
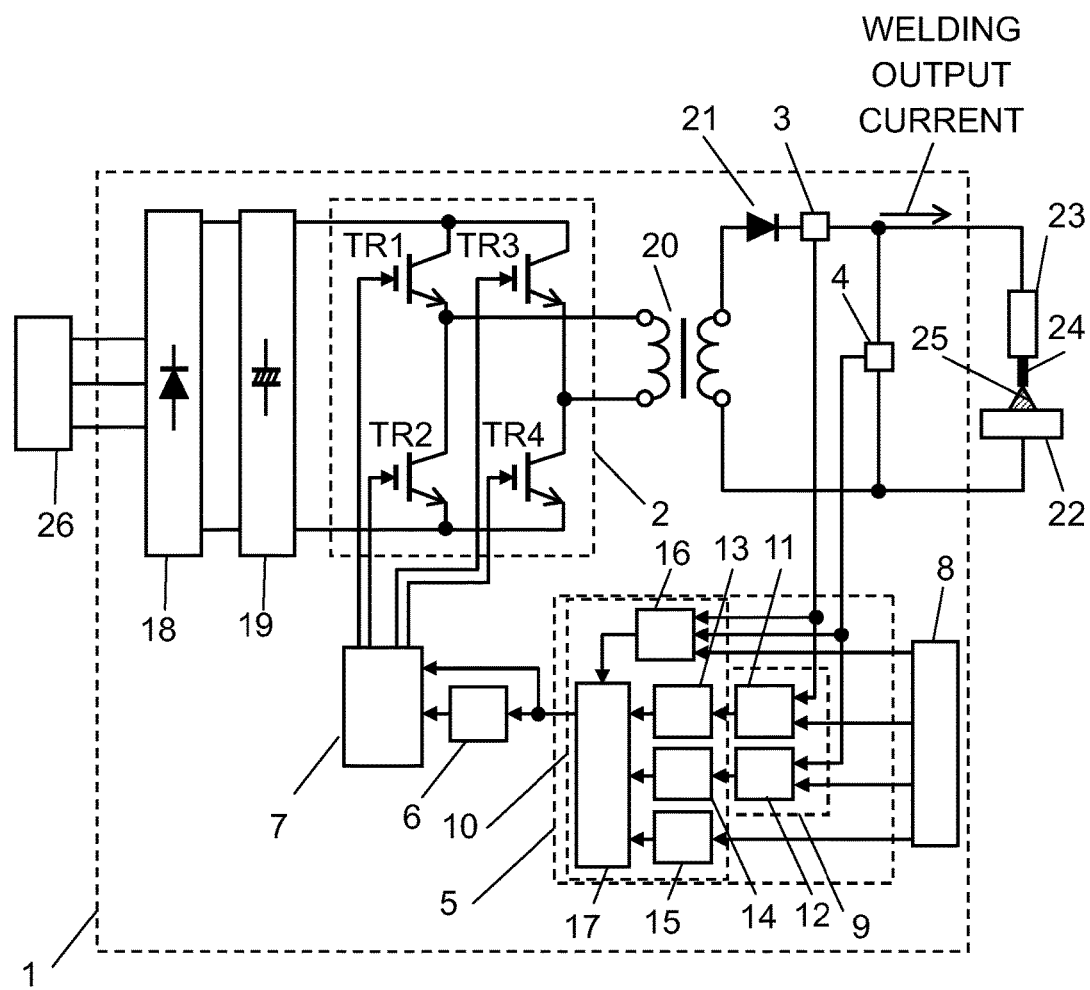
FIG. 5 schematically shows the structure of a welding device in accordance with a second exemplary embodiment.

FIG. 5 schematically shows the structure of welding device 1 of the second exemplary embodiment. FIG. 6 shows a waveform of welding output and timing of a signal in short-circuiting arc welding of the embodiment.

In the structure of the embodiment, like parts are identified by the same reference marks as in the structure of the first exemplary embodiment, and detailed description thereof will be omitted. The structure of the second embodiment differs from that of the first embodiment in having voltage detector 4 and in the structure and workings of controller 5.

In FIG. 5, welding device 1 has voltage detector 4 for detecting welding voltage of device 1. In the description of the exemplary embodiment, current detector 3 and voltage detector 4 are collectively mentioned as the output detector. Controller 5 of welding device 1 has output comparator 9 and calculator 10. Output comparator 9 has first comparator 11 (as a current comparator) and second comparator 12 (as a voltage comparator), both of which are formed of a CPU, for example. Calculator 10 has first calculator 13, second calculator 14, third calculator 15, welding-state determining section 16, and switching section 17, which are formed a CPU or the like.

The workings of such structured welding device 1 will be described below, taking a consumable-electrode arc welding device that performs welding while repeating a short-circuit period and an arc period.

Current detector 3, which is formed of a CT or the like, detects welding current and outputs it. Voltage detector 4, which is connected in parallel between electrode 24 and base metal 22, detects welding voltage and outputs it. Controller 5 receives welding current fed from current detector 3, welding voltage fed from voltage detector 4, and set voltage and set current fed from setting section 8. Controller 5 outputs an appropriate output-on period through a process (that will be described later).

First comparator 11 of controller 5 receives set current fed from setting section 8 and welding current fed from current detector 3. First comparator 11 calculates the difference between the set current and the welding current and outputs it to first calculator 13. Current feedback control is thus performed. Based on the difference in current fed from first comparator 11, first calculator 13 of calculator 10 calculates a first output-on period and outputs it to switching section 17.

Similarly, second comparator 12 of controller 5 receives set voltage fed from setting section 8 and welding voltage fed from voltage detector 4. Second comparator 12 calculates the difference between the set voltage and the welding voltage, and outputs it to second calculator 14. Voltage feedback control is thus performed. Based on the difference in voltage fed from second comparator 12, second calculator 14 of calculator 10 calculates a second output-on period and outputs it to switching section 17.

Third calculator 15 of calculator 10 receives setting output of a fixed value (e.g., set current, set voltage, and a threshold for determining welding condition) from setting section 8. Based on the setting output, third calculator 15 calculates a third output-on period and outputs it to switching section 17.

Welding-state determining section 16 of calculator 10 receives welding current fed from current detector 3, welding voltage fed from voltage detector 4, and setting output (e.g., set current, set voltage, and a threshold for determining welding condition) from setting section 8. Welding-state determining section 16 determines that the welding by electrode 24 on base metal 22 is in which following states—a short-circuit state; an arc state; occurrence state of a neck which is a sign of presage of a short-circuit state; and overcurrent state—and then outputs the result to switching section 17.

According to the determination of welding-state determining section 16, switching section 17 selects an appropriate output-on period from the first output-on period, the second output-on period, and the third output-on period, and outputs the selected one to the outside of controller 5.

Specifically, when welding-state determining section 16 determines the current state as a short-circuit state, switching section 17 outputs the first output-on period as the output-on period. In a word, current feedback control is performed. When welding-state determining section 16 determines the current state as an arc state, switching section 17 outputs the second output-on period as the output-on period. In a word, voltage feedback control is performed. When welding-state determining section 16 determines the current state as occurrence state of neck or overcurrent state, switching section 17 outputs the third output-on period as the output-on period. In a word, no feedback control is performed.

When welding voltage is below a reference value (e.g. 5.0 V) of setting section 8, the state is determined as a short-circuit state; whereas when the welding voltage exceeds the reference value, the state is determined as an arc state. When the current state is determined as a short-circuit state and the derivative value of welding voltage exceeds a reference value (e.g. 1.0 V/msec) of setting section 8, the welding state is determined as occurrence state of neck. Further, when welding current exceeds a reference value (e.g. 600 A) of setting section 8, the welding state is determined as overcurrent state.

As described above, when switching section 17 outputs any one of the first through the third output-on periods to frequency controller 6 and driver 7, the inverter control similar to that described in the first embodiment is performed.

Next, the waveform of welding output and switching timing of switching section 17 will be described with reference to FIG. 6. Specifically, the waveform shown at the top of FIG. 6 is welding current fed from current detector 3, and the second one from the top is welding voltage fed from voltage detector 4. Next three (i.e. the third through the fifth from the top) waveforms each show a signal indicating short-circuit/arc state, a signal indicating neck, and a signal indicating overcurrent—in the order named—determined by welding-state determining section 16. Further next three (i.e. the sixth through the eighth from the top) waveforms are first signal S1, second signal S2, and third signal S3, which are switched by switching section 17. Switching section 17 uses first signal S1 to switch the output-on period into the first output-on period, uses second signal S2 to switch the output-on period into the second output-on period, and uses third signal S3 to switch the output-on period into the third output-on period.

Figure 6:
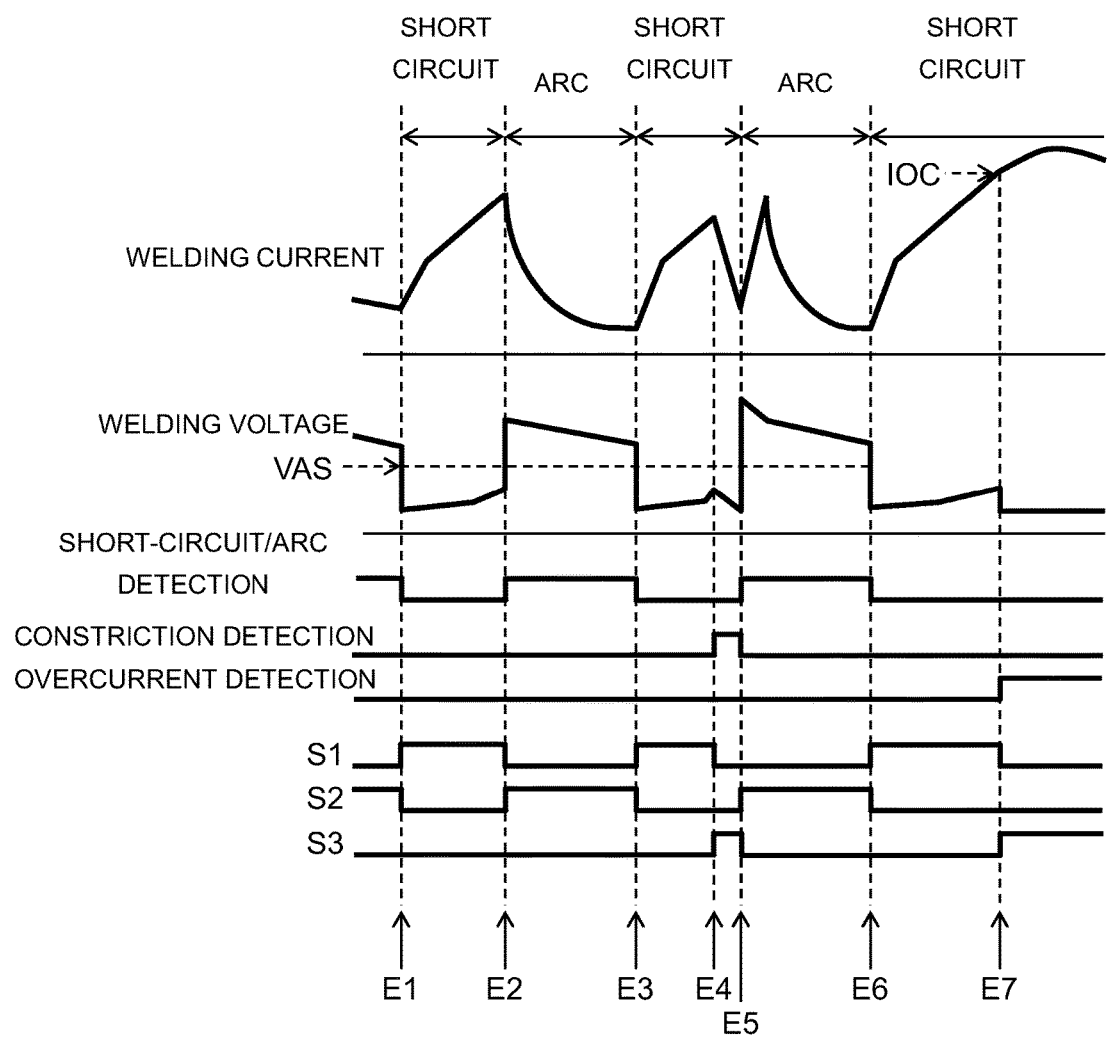
FIG. 6 shows a waveform of welding output in short-circuiting arc welding and timing of a signal in accordance with the second exemplary embodiment.
Figure 7:
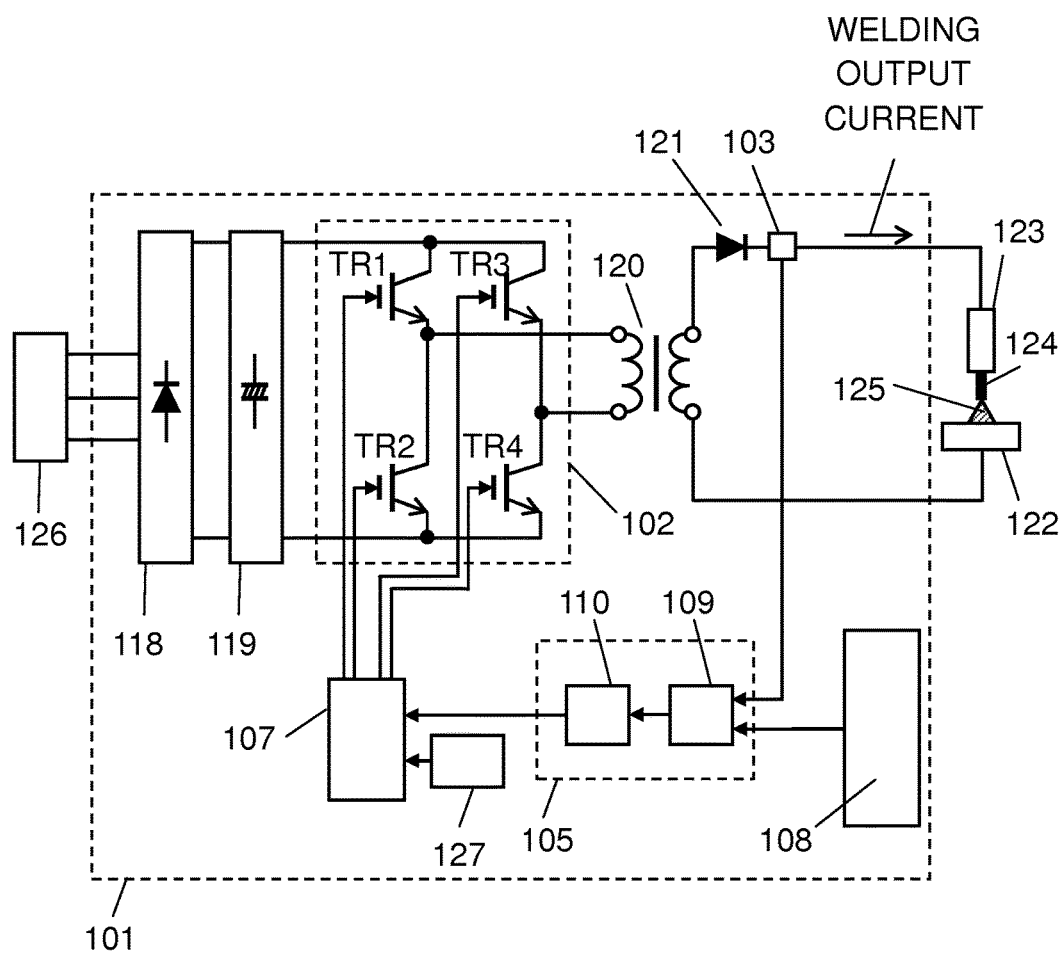
FIG. 7 schematically shows the structure of a conventional welding device.

In FIG. 6, each of time E1, time E3, and time E6 shows the time at which a short circuit occurs, and each of time E2 and time E5 shows the time at which an arc occurs. Time E4 shows the time at which a neck occurs, and time E7 shows the time at which an overcurrent state is detected.

FIG. 6 also shows overcurrent index value IOC (e.g., 600 A) and short-circuit/arc index value VAS (e.g., 5.0 V).

As for the signal indicating a short-circuit/arc state, the high level of the waveform shows that the state is in an arc state, while the low level of the waveform shows that the state is in a short-circuit state. As for the signal indicating neck, the high level of the signal shows a neck state and the low level shows a non-neck state. As for a signal indicating overcurrent, the high level of the signal shows that the state has overcurrent and the low level shows no overcurrent. As for the first signal S1 through third signal S3, the high level of each signal shows that the respective signal is ON (i.e. selected) and the low level shows that it is OFF (i.e. not selected). Welding-state determining section 16 sends first signal S1 through third signal S3 to switching section 17. Switching section 17 selects any one of first output-on period through third output-on period so as to correspond to the received signals and outputs an appropriate output-on period.

In FIG. 6, time E1 shows the time at which a short circuit occurs. The welding voltage at time E1 is lower than short-circuit/arc index value VAS; and accordingly, the signal indicating a short-circuit/arc state shows a short-circuit state (as shown by the low level). At that time, first signal S1 turns into the high level, so that current feedback control is performed. Setting section 8 outputs a set current with a predetermined gradient (of 200 A/msec, for example) and performs appropriate short-circuit welding control.

In FIG. 6, time E2 shows the time at which an arc occurs. The welding voltage at time E2 exceeds short-circuit/arc index value VAS; and accordingly, the signal indicating a short-circuit/arc state shows an arc state (as shown by the high level). At that time, second signal S2 turns into the high level, so that voltage feedback control is performed. Setting section 8 outputs a predetermined set voltage (of 30.0 V, for example) and performs appropriate arc welding control.

In FIG. 6, when a short circuit occurs again at time E3, current feedback control is performed in a similar manner at time E1.

In FIG. 6, a neck occurs at time E4; and accordingly, the signal indicating neck turns into the high level. If the derivative value of welding voltage exceeds a reference value (e.g. 1.0 V/msec), the welding state is determined as occurrence state of neck. At that time, third signal S3 turns into the high level, so that fixed output control is performed. Setting section 8 outputs a predetermined fixed value (of 5% of maximum output, for example) and performs appropriate neck control to decrease welding current by the time the short-circuit state ends. The neck control decreases welding current to suppress spatters at short-circuit release.

In FIG. 6, when an arc occurs again at time E5, voltage feedback control is performed in a manner similar to that performed at time E2.

In FIG. 6, when a short circuit occurs again at time E6, current feedback control is performed in a manner similar to that performed at time E1.

In FIG. 6, overcurrent occurs at time E7; and accordingly, the signal indicating overcurrent turns into the high level. If welding current exceeds overcurrent index value IOC (e.g. 600 A), the state is determined as an overcurrent state. At that time, third signal S3 turns into the high level, so that fixed output control is performed. Setting section 8 outputs a predetermined fixed value (of 5% of maximum output, for example) and performs appropriate overcurrent control to protect welding device 1 from overcurrent. The overcurrent control decreases such excessively high welding current.

As described above, the welding device of the embodiment switches between predetermined output-on periods according to a welding state and switches between current feedback control, voltage feedback control, and fixed output control to perform optimum control for each welding state.

The structure of the embodiment determines an inverter frequency based on an output-on period. Therefore, even when control methods are switched discontinuously, problem by switching inverter frequencies does not occur.

INDUSTRIAL APPLICABILITY

As described above, the present disclosure provides a welding device capable of changing an inverter frequency according to an output-on period, thereby providing welding with high quality. It is therefore useful for a welding device using inverter control.

REFERENCE MARKS IN THE DRAWINGS 1, 101 welding device
2, 102 switching section
3, 103 current detector
4 voltage detector
5, 105 controller
6 frequency controller
7, 107 driver
8, 108 setting section
9, 109 output comparator
10, 110 calculator
11 first comparator
12 second comparator
13 first calculator
14 second calculator
15 third calculator
16 welding-state determining section
17 switching section
18, 118 primary rectifier
19, 119 smoothing capacitor
20, 120 transformer
21, 121 secondary rectifier
22, 122 base metal
23, 123 torch
24, 124 electrode
25, 125 arc
26, 126 external device
127 triangular-wave generator
TR1 first switching element
TR2 second switching element
TR3 third switching element
TR4 fourth switching element
D1 first predetermined value
D2 second predetermined value
DMAX maximum output-on period
F1 first inverter frequency
F2 second inverter frequency
FMAX maximum inverter frequency
T1 first cycle
T2 second cycle
TMIN minimum cycle
ED1 time (at which an output-on period reaches first predetermined value D1)
ED2 time (at which an output-on period reaches second predetermined value D2)
E1 time (at which a short circuit occurs)
E2 time (at which an arc occurs)
E3 time (at which a short circuit occurs)
E4 time (at which occurrence state of neck is detected)
E5 time (at which an arc occurs)
E6 time (at which a short circuit occurs)
E7 time (at which overcurrent state is detected)
IOC overcurrent index value
VAS short-circuit/arc index value
S1 first signal
S2 second signal
S3 third signal

The invention claimed is:

1. A welding device comprising:
a switching circuit having switching elements;
a current detector and a voltage detector that detect a welding output;
a controller programmed to calculate an output-on period of the switching circuit based on a setting output and the welding output;
a frequency controller programmed to determine and change an inverter frequency based on the output-on period; and
a driver controller programmed to control an on/off operation of the switching elements based on the inverter frequency and the output-on period,
wherein the output-on period is a proportion of time of a duty cycle during which the welding output is on,
when the duty cycle of the output-on period is a first ratio, the inverter frequency is determined and set, by the frequency controller, to a first frequency, and the switching elements are driven, by the driver controller, at the first frequency,
when the duty cycle of the output-on period is a second ratio smaller than the first ratio, the inverter frequency is changed, by the frequency controller, to a second frequency higher than the first frequency, and the switching elements are driven, by the driver controller, at the second frequency, and when the duty cycle of the output-on period is a third ratio smaller than each of the first ratio and the second ratio, the inverter frequency is changed, by the frequency controller, to a third frequency higher than each of the first frequency and the second frequency, and the switching elements are driven, by the driver controller, at the third frequency.

2. The welding device according to claim 1, wherein the controller has an output comparator that calculates an output difference between the setting output and the welding output; and a calculator that calculates the output-on period based on the output difference.

3. The welding device according to claim 2, wherein, the setting output includes a set current,
the welding output includes a welding current,
the output comparator calculates a current difference between the set current and the welding current, and
the calculator calculates the output-on period based on the current difference.

4. The welding device according to claim 3, wherein the frequency controller changes the inverter frequency stepwise in the output-on period.

5. The welding device according to claim 3, wherein the frequency controller changes the inverter frequency continuously in the output-on period.

6. The welding device according to claim 2, wherein, the setting output includes a set voltage,
the welding output includes a welding voltage,
the output comparator calculates a voltage difference between the set voltage and the welding voltage, and
the calculator calculates the output-on period based on the voltage difference.

7. The welding device according to claim 6, wherein the frequency controller changes the inverter frequency stepwise in the output-on period.

8. The welding device according to claim 6, wherein the frequency controller changes the inverter frequency continuously in the output-on period.

9. The welding device according to claim 2, wherein, the setting output includes a set current and a set voltage,
the welding output includes a welding current and a welding voltage,
the output detector has a current detector and a voltage detector,
the output comparator has
a current comparator that calculates a current difference between the set current and the welding current; and
a voltage comparator that calculates a voltage difference between the set voltage and the welding voltage, and the calculator has:
a first calculator that calculates a first output-on period based on the current difference;
a second calculator that calculates a second output-on period based on the voltage difference;
a third calculator that calculates a third output-on period based on the setting output;
a state-determining section that determines a welding state based on the set current, the set voltage, the welding current, and the welding voltage; and
a switching section that selects a period by switching the first output-on period, the second output-on period, and the third output-on period based on the welding state, and outputs the selected period as the output-on period.

10. The welding device according to claim 9, wherein when the welding state is a short-circuit state, the switching section employs the first output-on period for the output-on period,
when the welding state is an arc state, the switching section employs the second output-on period for the output-on period, and
when the welding state is an occurrence state of a neck or an overcurrent state, the switching section employs the third output-on period for the output-on period.

11. The welding device according to claim 10, wherein the frequency controller changes the inverter frequency stepwise in the output-on period.

12. The welding device according to claim 10, wherein the frequency controller changes the inverter frequency continuously in the output-on period.

13. The welding device according to claim 9, wherein the frequency controller changes the inverter frequency stepwise in the output-on period.

14. The welding device according to claim 9, wherein the frequency controller changes the inverter frequency continuously in the output-on period.

15. The welding device according to claim 2, wherein the frequency controller changes the inverter frequency stepwise in the output-on period.

16. The welding device according to claim 2, wherein the frequency controller changes the inverter frequency continuously in the output-on period.

17. The welding device according to claim 1, wherein the frequency controller changes the inverter frequency stepwise in the output-on period.

18. The welding device according to claim 1, wherein the frequency controller changes the inverter frequency continuously in the output-on period.

19. The welding device according to claim 1, wherein the first frequency, the second frequency, and the third frequency are determined, by the frequency controller, to have integral relationships therebetween, and a feedback control frequency is set, by the frequency controller, to a fixed value by changing the inverter frequency on the basis of the integral relationships.

* * * * *